(12) United States Patent
Chen

(10) Patent No.: US 9,960,543 B2
(45) Date of Patent: May 1, 2018

(54) ELECTRICAL CONNECTOR AND MANUFACTURING METHOD THEREOF

(71) Applicant: JITS COMM CO., LTD(GD), Dongguan (CN)

(72) Inventor: Huanyi Chen, Dongguan (CN)

(73) Assignee: JITS COMM CO., LTD(GD), Dongguan (CN)

( * ) Notice: Subject to any disclaimer, the term of this patent is extended or adjusted under 35 U.S.C. 154(b) by 189 days.

(21) Appl. No.: 14/966,748

(22) Filed: Dec. 11, 2015

(65) Prior Publication Data

US 2016/0099526 A1   Apr. 7, 2016

(30) Foreign Application Priority Data

Aug. 14, 2015   (CN) .......................... 2015 1 0498033

(51) Int. Cl.
*H01R 13/6585* (2011.01)
*H01R 24/60* (2011.01)
*H01R 43/16* (2006.01)
*B29C 70/72* (2006.01)
*H01R 43/24* (2006.01)
*H01R 24/00* (2011.01)
*H01R 13/504* (2006.01)
*B29C 70/68* (2006.01)
(Continued)

(52) U.S. Cl.
CPC ......... *H01R 13/6585* (2013.01); *B29C 70/72* (2013.01); *H01R 13/5045* (2013.01); *H01R 23/02* (2013.01); *H01R 24/60* (2013.01); *H01R 43/16* (2013.01); *H01R 43/24* (2013.01); *B29C 70/683* (2013.01); *B29K 2105/20* (2013.01); *B29K 2995/0005* (2013.01); *B29K 2995/0007* (2013.01); *B29L 2031/3481* (2013.01); *H01R 2107/00* (2013.01)

(58) Field of Classification Search
CPC ............ H01R 13/6585; H01R 13/5045; H01R 24/60; H01R 43/16; H01R 43/24; H01R 2107/00; H01R 23/02; H01R 4/06; B29C 70/72; B29C 70/683; B29K 2105/20; B29K 2995/0005; B29K 2995/0007; B29L 2031/3481
USPC ........... 439/607.05, 430, 660, 874, 875, 880
See application file for complete search history.

(56) References Cited

U.S. PATENT DOCUMENTS 8,808,029 B2 * 8/2014 Castillo .............. H01R 13/6585
                                                      439/607.05
9,484,679 B2 * 11/2016 Guo .................... H01R 13/6585
(Continued)

*Primary Examiner* — Tulsidas C Patel
*Assistant Examiner* — Travis Chambers
(74) *Attorney, Agent, or Firm* — Shimokaji IP

(57) ABSTRACT

A electrical connector includes an insulating body having a tongue plate, a plurality of upper conductive terminals having upper contact portions, and a plurality of lower conductive terminals having lower contact portions; the upper and lower conductive terminals are buried and molded in the insulating body, the upper contact portions and the lower contact portions are vertically aligned one by one and respectively exposed on an upper surface and a lower surface of the tongue plate; the upper conductive terminals vertically corresponding to the lower conductive terminals one by one so as to form a plurality of corresponding columns, and the upper and lower conductive terminals of at least one corresponding columns are fixedly connected with each other by riveting.

27 Claims, 15 Drawing Sheets

(51) Int. Cl.
*H01R 107/00* (2006.01)
*B29L 31/34* (2006.01)
*B29K 105/20* (2006.01)

(56) References Cited

U.S. PATENT DOCUMENTS

| | | | |
|---|---|---|---|
| 9,742,125 B2* | 8/2017 | Zhao | H01R 13/6594 |
| 2013/0059460 A1* | 3/2013 | Sasame | H01R 24/60 439/345 |
| 2016/0118750 A1* | 4/2016 | Guo | H01R 13/6585 439/78 |

* cited by examiner

ELECTRICAL CONNECTOR AND MANUFACTURING METHOD THEREOF

RELATED APPLICATIONS

This application claims the benefit of priority to Chinese Patent Application No. 201510498033.8, filed on Aug. 14, 2015, which is hereby incorporated by reference in its entirety.

FIELD OF THE INVENTION

The present invention relates in general to an electrical connector, and more particularly to an electrical connector having simple manufacture, small size, and high-speed transmission.

BACKGROUND OF THE INVENTION

Currently, USB (Universal Serial Bus) connectors have been widely used in various electronic products, such as data and charging interfaces of mobile phone and computer, and with the development of society, the electronic products require higher speed transmission for the USB connector.

A Chinese patent (CN201420479369.0) discloses an USB connector that is capable of high-speed transmission, which includes a metal spacer, a first terminal group, a first plastic body in which the metal spacer and the first terminal group are integrally molded, a second terminal group, a second plastic body in which the second terminal group is integrally molded, a holder for holding the first plastic body and the second plastic body to be a whole, and a metal housing for shielding the first plastic body and the second plastic body.

However, during the manufacturing process of the USB connector, firstly integrally molding the first plastic body on the first metal spacer and the first terminal group, molding the second plastic body on the second terminal group; secondly assembling the second plastic body to a mounting groove of the first plastic body; lastly inserting the holder from a butting tongue of the first plastic body into a first holding portion of the first plastic body and a second holding portion of the second plastic body so that the first plastic body and the second plastic body are holder to be a whole. This traditional USB connector has too many components and complex manufacturing process, thereby increasing the manufacturing cost.

Furthermore, the USB connector has two rows of the upper and lower terminal groups, which can provide positive and negative connections, however, the two rows of terminal groups also have two rows of soldering pins. Two rows of soldering pins will undoubtedly increase the size of the USB connector and take up more space. The application thereof has been greatly restricted under the trend of ultra-thin electronic product. In addition, two side-by-side rows of soldering pins are not conducive for soldering and testing, and for the promotion and application of the USB connector.

Hence, it is desired to provide a new electrical connector to overcome the above-mentioned drawbacks.

SUMMARY OF THE INVENTION

One objective of the present invention is to provide an electrical connector having simple manufacture, small size, and high-speed transmission.

Another objective of the present invention is to provide a manufacturing method of an electrical connector, which has simple manufacture, small size, and high-speed transmission.

The above objectives are achieved by providing an electrical connector, which includes an insulating body having a tongue plate, a plurality of upper conductive terminals, and a plurality of lower conductive terminals, each of the upper conductive terminals has an upper contact portion, each of the lower conductive terminals has a lower contact portion, the upper conductive terminals and the lower conductive terminals are buried and molded in the insulating body, the upper contact portions and the lower contact portions are vertically aligned one by one and respectively exposed on an upper surface and a lower surface of the tongue plate, the upper conductive terminals vertically correspond to the lower conductive terminals one by one so as to form a plurality of corresponding columns, and the upper and lower conductive terminals of at least one corresponding column are fixedly connected with each other by riveting.

Preferably, at least one upper conductive terminal that is fixedly connected with each other is an upper power terminal and/or an upper ground terminal, and at least one lower conductive terminal that is fixedly connected with each other is a lower power terminal and/or a lower ground terminal.

Preferably, the upper contact portion of the upper conductive terminal that is fixedly connected with each other has an upper feeding portion at a front end thereof, the lower contact portion of the lower conductive terminal that is fixedly connected with each other has a lower feeding portion at a front end thereof, and the upper conductive terminal and the lower conductive terminal are fixedly connected with each other by the upper feeding portion and the lower feeding portion.

Preferably, an opening is opened forward through the upper feeding portion, the lower feeding portion is riveted in the opening, or the opening is opened forward through the lower feeding portion, and the upper feeding portion is riveted in the opening.

Preferably, a rear end of the upper contact portion of the upper conductive terminal that is fixedly connected with each other has an upper fixing portion buried in the insulating body, a rear end of the lower contact portion of the lower conductive terminal that is fixedly connected with each other has a lower fixing portion buried in the insulating body, and the upper conductive terminal and the lower conductive terminal are fixedly connected with each other by the upper fixing portion and the lower fixing portion.

Preferably, one of the upper fixing portion and the lower fixing portion has a protrusion, the other one of the upper fixing portion and the lower fixing portion has a through hole, and the protrusion is riveted in the through hole so as to fix the upper fixing portion to the lower fixing portion.

Preferably, a recessed portion is formed by recessing the upper fixing portion downward, a bottom surface of the recessed portion is contacted with a top surface of the lower fixing portion, and a riveting hole passing through the recessed portion and the lower fixing portion is formed by riveting pressing.

Preferably, the upper fixing portion is formed by bending and extending firstly downward and then rearward from the rear end of the upper contact portion.

Preferably, the width of the upper and lower fixing portions is larger than that of the corresponding upper and lower contact portions.

Preferably, an upper extending portion is formed by bending and extending downward from a rear end of the upper fixing portion, and at least one convex is projected forward and/or backward on the upper extending portion.

Preferably, the upper conductive terminals and the lower conductive terminals respectively have soldering portions electrically connected to a circuit board, and one of the upper conductive terminal and the lower conductive terminal that are fixedly connected with each other has one soldering portion.

Preferably, the soldering portions of the upper conductive terminals and the lower conductive terminals are arranged in a row.

Preferably, the upper conductive terminals include two upper ground terminals respectively configured at two sides thereof, and the lower conductive terminals include two lower ground terminals respectively configured at two sides thereof.

Preferably, the two upper ground terminals are formed by bending and extending upward from external edges of the lower ground terminals of the corresponding columns.

Preferably, the upper and lower ground terminals of each corresponding column together form a hollowed groove that extends vertically therethrough, each side of the tongue plate correspondingly has a hollowed gap that extends vertically therethrough, and a sidewall of each groove is exposed in the gap.

Preferably, the upper conductive terminals include a plurality of pairs of upper differential signal terminals, each of which has an upper fixing portion, the lower conductive terminals include a plurality of pairs of lower differential signal terminals, each of which has a lower fixing portion, a pair of the upper differential signal terminals is adjacent to and configured at the inner side of each upper ground terminal, a pair of the lower differential signal terminals is adjacent to and configured at the inner side of each lower ground terminal, and the upper fixing portion and the lower fixing portion of at least one pair of the upper differential signal terminals and the lower differential signal terminals of the corresponding columns are misaligned in a direction of left and right.

Preferably, the upper ground terminal has an upper fixing portion buried in the insulating body, the lower ground terminal has a lower fixing portion buried in the insulating body, and a contact end extends outward from the upper fixing portion of the upper ground terminal or the lower fixing portion of the lower ground terminal to the external of the insulating body to contact with a metal housing.

Preferably, a through slot extending vertically through the tongue plate is opened between every two adjacent upper conductive terminals.

Preferably, the electrical connector further includes an insulating block buried and molded on one of the upper conductive terminals and the lower conductive terminals.

Preferably, the insulating block has a plurality of positioning portions for positioning the other one of the upper conductive terminals and the lower conductive terminals.

The above objectives are also achieved by providing a method for manufacturing an electrical connector including: step 1, providing a plurality of upper conductive terminals and a plurality of lower conductive terminals, each of the upper conductive terminals having an upper contact portion, each of the lower conductive terminals having a lower contact portion; step 2, the upper conductive terminals vertically corresponding to the lower conductive terminals one by one so as to form a plurality of corresponding columns, the upper contact portions and the lower contact portions being vertically aligned one by one; step 3, fixedly connecting the upper and lower conductive terminals of at least one corresponding columns by riveting; and step 4, forming an insulating body having a tongue plate on the upper conductive terminals and the lower conductive terminals, the upper contact portions and the lower contact portions being respectively exposed on an upper surface and a lower surface of the tongue plate.

Preferably, at least one upper conductive terminal that is fixedly connected is an upper power terminal and/or an upper ground terminal, and at least one lower conductive terminal that is fixedly connected is a lower power terminals and/or a lower ground terminal.

Preferably, the upper contact portion of the upper conductive terminal that is fixedly connected has an upper feeding portion at the front end thereof, the lower contact portion of the lower conductive terminal that is fixedly connected has a lower feeding portion at the front end thereof, and the step 3 is fixedly connecting the upper feeding portion and the lower feeding portion.

Preferably, a rear end of the upper contact portion of the upper conductive terminal that is fixedly connected with each other has an upper fixing portion buried in the insulating body, a rear end of the lower contact portion of the lower conductive terminal that is fixedly connected with each other has a lower fixing portion buried in the insulating body, and the step 3 includes fixedly connecting the upper fixing portion and the lower fixing portion.

Preferably, every two adjacent upper contact portions and every two adjacent lower contact portions are connected with a feeding bridge therebetween, the feeding bridges of the two adjacent upper contact portions and the two adjacent lower contact portions of the corresponding columns are misaligned in a direction of front and back, and the method further includes a step of removing the feeding bridges to form through slots that extend vertically through the tongue plate corresponding to the position of the feeding bridges after step 4.

Preferably, the upper feeding portions are connected with an upper feeding strip at front ends thereof, the lower feeding portions are connected with a lower feeding strip at front ends thereof, and the step 3 further includes a step of removing the upper feeding strip and the lower feeding strip.

Preferably, the method for manufacturing an electrical connector further includes a step of molding an insulating block on one of the upper conductive terminals and the lower conductive terminals before step 2.

The present invention further provides another electrical connector, which includes a plurality of upper conductive terminals, a plurality of lower conductive terminals, and at least one isolating piece, each of the upper conductive terminals has an upper contact portion, each of the lower conductive terminals has a lower contact portion, the upper contact portions and the lower contact portions are vertically aligned one by one, and the at least one isolating piece extends inward from the external edge of the upper conductive terminals or the lower conductive terminals to the middle of the upper conductive terminals and the lower conductive terminals.

Preferably, the upper conductive terminals include two upper ground terminals respectively arranged at two sides thereof, the lower conductive terminals include two lower ground terminals respectively arranged at two sides thereof, and the isolating piece extends inward from the external edge of the upper ground terminal or the lower ground terminal.

Preferably, the upper conductive terminals include a plurality of pairs of upper differential signal terminals, a pair of the upper differential signal terminals is adjacent to and configured at the inner side of each upper ground terminal, the lower conductive terminals include a plurality of pairs of lower differential signal terminals, a pair of the lower differential signal terminals is adjacent to and configured at the inner side of each lower ground terminal, and the isolating piece extends to the middle of the upper and lower differential signal terminals that are respectively adjacent to the upper and lower ground terminals so as to isolate the upper and lower differential signal terminals.

Preferably, the upper and lower ground terminals of the same side together form a hollowed groove extending vertically therethrough, a sidewall of the groove is formed by bending and extending from one of the upper ground terminal and the lower ground terminal, the isolating piece is formed by bending and extending inward from a sidewall of the other one of the upper ground terminal and the lower ground terminal.

Preferably, there are two isolating pieces respectively extending inward from two external edges of the upper conductive terminals or the lower conductive terminals.

The present invention provides a third electrical connector, which includes a plurality of upper conductive terminals having upper soldering portions at rear ends thereof, a plurality of lower conductive terminals having lower soldering portions at rear ends thereof, and two side shields, the upper soldering portions and the lower soldering portions are adapted for connecting with a circuit board, the two side shields extends backward from two external edges of the upper conductive terminals or the lower conductive terminals to shield the two sides of the upper soldering portions and the lower soldering portions.

Preferably, the upper conductive terminals include two upper ground terminals respectively arranged at two sides thereof, the lower conductive terminals include two lower ground terminals respectively arranged at two sides thereof, and the two side shields extend backward from the two external edges of the upper ground terminals or the lower ground terminals.

Preferably, the electrical connector further includes an insulating body, each upper ground terminal has an upper fixing portion buried in the insulating body, each lower ground terminal has a lower fixing portion buried in the insulating body, an extending portion is formed by bending and extending downward from a rear end of the upper fixing portion or the lower fixing portion, the side shield is formed by extending backward from a external edge of the extending portion.

Preferably, a soldering pin is formed by extending backward from the side shield to be connected with the circuit board In comparison with the prior art, the electrical connector of the present invention has several advantages as follow:

The upper and lower conductive terminals of at least one corresponding column are fixedly connected with each other by riveting, so the upper and lower conductive terminals can be accurately and efficiently aligned when being buried and molded in the insulating body. In addition, the upper and lower conductive terminals fixedly connected with each other can be simultaneously buried and molded in the insulating body, that is, the whole manufacturing process just needs one burying and molding process, thereby simplifying manufacturing process and reducing production costs. Furthermore, the upper and lower conductive terminals fixedly connected with each other can prevent the generation of resonance and effectively prevent the signal crosstalk, so the electrical connector can provide high-speed transmission, which would need not an additional metal spacer. Moreover, the upper and lower conductive terminals fixedly connected with each other have been electrically connected, so just one of them needs a soldering portion to connect with an external circuit board, which undoubtedly reduces the size of the electrical connector due less soldering portions. Lastly, the corresponding columns are fixedly connected by riveting, and the process is simple and easy to implement. Thus, compared with the prior art, the present invention has advantages of simple structure, simple manufacturing process, small size, high-speed transmission, and reduced manufacturing costs.

Other aspects, features, and advantages of this invention will become apparent from the following detailed description when taken in conjunction with the accompanying drawings, which are a part of this disclosure and which illustrate, by way of example, principles of this invention.

DETAILED DESCRIPTION OF ILLUSTRATED EMBODIMENTS

Figure 1:
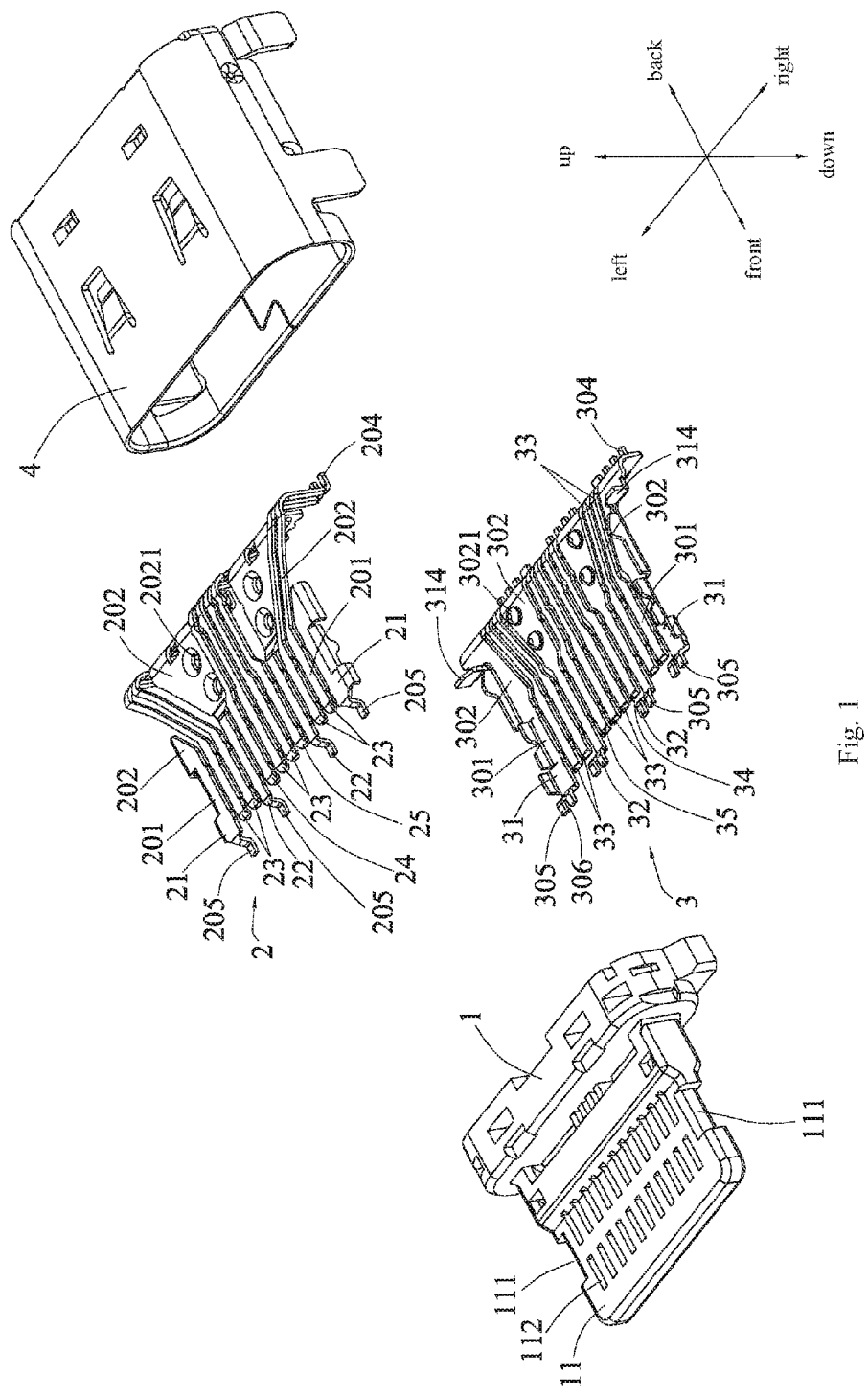
FIG. 1 is an exploded view of an electrical connector according to the first embodiment of the present invention.

In order to describe the technical solutions, structure features, purpose and effect to achieve of the present invention in detail, various preferred embodiments will now be described with reference to the Figures.

Embodiment 1

As shown in FIGS. 1 to 7, the present invention provides an electrical connector for being soldered with a circuit board (not shown), the electrical connector includes an insulating body 1, and an upper row of conductive terminals 2 and a lower row of conductive terminals 3 buried and molded in the insulating body 1. The upper row of conductive terminals 2 includes a plurality of upper conductive terminals, which are arranged in a row and located above, and the lower row of conductive terminals 3 includes a plurality of lower conductive terminals, which are arranged in a row and located below. The electrical connector further includes a metal housing 4, the metal housing 4 coats the insulating body 1.

The insulating body 1 has a tongue plate 11, each upper conductive terminal has an upper contact portion 201 and an upper fixing portion 202, the upper fixing portion 202 is buried in the insulating body 1, and the upper contact portion 201 is exposed on the upper surface of the tongue plate 11. Each lower conductive terminal has a lower contact portion 301 and a lower fixing portion 302, the lower fixing portion 302 is buried in the insulating body 1, and the lower contact portion 301 is exposed on the lower surface of the tongue plate 11. The upper row of conductive terminals 2 corresponds to the lower row of conductive terminals 3 one by one so as to form a plurality of corresponding columns, and the upper contact portions 201 of the upper row of conductive terminals 2 and the lower contact portions 301 of the lower row of conductive terminals 3 are vertically aligned one by one.

The upper row of conductive terminals 2 includes two upper ground terminals 21, two upper power terminals 22 and a plurality of pairs of upper differential signal terminals 23. The two upper ground terminals 21 are arranged at two sides of the upper row of conductive terminals 2, the upper fixing portion 202 of the upper power terminal 22 is formed by bending and extending firstly downward and then rearward from the rear end of the upper contact portion 201 thereof, and the upper fixing portion 202 and the upper contact portion 201 show a shape of a ladder.

The lower row of conductive terminals 3 includes two lower ground terminals 31, two lower power terminals 32 and a plurality of pairs of lower differential signal terminals 33. The two lower ground terminals 31 are arranged at two sides of the lower row of conductive terminals 3, and the upper and lower differential signal terminals 23, 33 are used for data transmission with a butted electrical connector.

The upper and lower conductive terminals of at least one corresponding columns are fixedly connected with each other by riveting. Specifically, at least one upper conductive terminal that is fixedly connected with each other by riveting is an upper power terminal 22 and/or an upper ground terminal 21, and at least one lower conductive terminal that is fixedly connected with each other by riveting is a lower power terminal 32 and/or a lower ground terminal 31. In this embodiment, the upper contact portions 201 of the upper ground terminals 21 and the upper power terminals 22 respectively have an upper feeding portion 205 at front ends thereof for connecting an upper feeding strip 20, the lower contact portions 301 of the lower ground terminals 31 and the lower power terminals 32 respectively have a lower feeding portion 305 at front ends thereof for connecting a lower feeding strip 30. An opening 306 is opened forward through each lower feeding portion 305, and each upper feeding portion 205 is shaped into a strip and riveted in the opening 306 so as to fixedly connect the upper and lower ground terminals 21, 31 and the upper and lower power terminals 22, 32 by riveting. Of course, in other embodiments, the opening 306 can be opened forward through each upper feeding portion 205, and each lower feeding portion 305 is riveted in the opening 306. More specifically, the upper feeding portion 205 is formed by bending and extending firstly downward and then forward from the corresponding upper contact portion 201, and the lower feeding portion 305 is formed by bending and extending firstly upward and then forward from the corresponding lower contact portion 301, so the upper and lower feeding portion 205, 305 can extend to a same plane to be riveted with each other.

The upper and lower conductive terminals of at least one corresponding columns are fixedly connected with each other by riveting the upper fixing portion 202 and the lower fixing portion 302, particularly, in the present embodiment, the upper fixing portion 202 of the upper power terminal 22 and the lower fixing portion 302 of the lower power terminal 32 are fixedly connected by riveting, one of the upper fixing portion 202 of the upper power terminal 22 and the lower fixing portion 302 of the lower power terminal 32 has a protrusion 3021, the other one of the upper fixing portion 202 of the upper power terminal 22 and the lower fixing portion 302 of the lower power terminal 32 has a through hole 2021, and the protrusion 3021 is riveted in the through hole 2021 so as to fix the upper fixing portion 202 to the lower fixing portion 302. More specifically, the lower fixing portion 302 of the lower power terminal 32 has a protrusion 3021 formed by extending upward, the upper fixing portion 202 of the upper power terminal 22 has a through hole 2021, and the protrusion 3021 is riveted in the through hole 2021. Of course, in other embodiment, the upper fixing portion 202 of the upper power terminal 22 can be provided with the protrusion 3021 formed by extending downward, the lower fixing portion 302 of the lower power terminal 32 has the through hole 2021, and the protrusion 3021 is riveted in the through hole 2021.

Preferably, the width of the upper fixing portion 202 of the upper power terminal 22 is larger than that of the corresponding upper contact portion 201 thereof; similarly, the width of the lower fixing portion 302 of the lower power terminal 32 is larger than that of the corresponding lower contact portion 301 thereof. The widened upper and lower fixing portions 202, 302 of the upper and lower power terminals 22, 32 can effectively increase its current carrying capacity, thereby improving the transmission rate of the electrical connector.

Preferably, an upper extending portion 203 is formed by bending and extending downward from a rear end of the upper fixing portion 202, and at least one convex 3031 is projected forward and/or backward on the upper extending portion 203. The insulating body 1 is formed via a process of injection molding, when molding the insulating body 1 on the upper and lower rows of conductive terminals 2, 3, the convexes 3031 are used for positioning the fixedly connected upper and lower rows of conductive terminals 2, 3, and for preventing the upper and lower rows of conductive terminals 2, 3 from moving and deforming by the impact of injection molding.

In fact, the lower fixing portion 302 also has a lower extending portion 303 that is formed by bending and extending downwardly from the rear end of the lower fixing portion 302, and the lower ends of the upper extending portion 203 and the lower extending portion 303 are located at the same height so as to facilitate the arrangement of soldering portions. More specifically, the upper conductive terminals and the lower conductive terminals respectively have soldering portions electrically connected to a circuit board, the upper conductive terminals have upper soldering portions 204 that are formed by bending and extending rearward from the lower ends of the upper soldering portions 203, and the lower conductive terminals have lower soldering portions 304 that are formed by bending and extending rearward from the lower ends of the lower soldering portions 303. Since the lower end of the upper extending portion 203 and the lower extending portion 303 are located at the same height, so the upper soldering portion 204 and the lower soldering portion 304 are arranged in a same row. Further, since the upper and lower conductive terminals that are fixedly connected with each other have been electrically connected, and therefore just one of them needs one soldering portion.

In the present embodiment, each of the remaining upper conductive terminals has one upper soldering portion 204 except the upper power terminals 22 and the upper ground terminals 21, the upper soldering portion 204 is formed by extending from the upper extending portion 203, and each of the lower conductive terminals has a lower soldering portion 304. Particularly, the upper ground terminal 21 does not have the upper extending portion 203. Of course, in other embodiments, each of the upper conductive terminals can have an upper soldering portion 204, and the lower ground terminals 31 and the lower power terminals 32 do not have the lower soldering portions 304. Thus, the upper soldering portion 204 and the lower soldering portion 304 can be arranged in a row but not two rows due to reduced number of the upper soldering portion 204, thereby reducing the space needed for arranging the upper and lower soldering portions 204 and 304, and then reducing the size of the electrical connector.

A contact end 314 extends outward from the upper fixing portion 202 of each upper ground terminal 21 or the lower fixing portion 302 of each lower ground terminal 31, the two contact ends 314 are exposed on both sides of the insulating body 1 to contact with the metal housing 4.

In this embodiment, the contact ends 314 are configured on the lower fixing portions 302 of the lower ground terminals 31. Each lower ground terminal 31 is grounded both by the lower ground portion 304 and the contact end 314, and the grounding effect of the upper and lower ground terminals 21, 31 is enhanced due to the contact end 314.

Specifically, as described above, the number of the upper power terminals 22, the upper ground terminals 21, the lower power terminals 32, and the lower ground terminals 31 is respectively two, the two upper ground terminals 21 are respectively arranged at two sides of the upper conductive terminals, and the two lower ground terminals 31 are respectively arranged at two sides of the lower conductive terminals. The upper and lower ground terminals 21, 31 of each corresponding column together form a hollowed groove 5 that extends vertically therethrough, each side of the tongue plate 11 correspondingly has a hollowed gap 111 that extends vertically therethrough, and a sidewall 51 of the groove 5 is exposed in the gap 111. So that when the butted electrical connector is inserted, elastic elements (not shown) of the butted electrical connector can enter into the grooves 5 and clasp the sidewalls 51 thereof so as to enhance the butting therebetween. The sidewall 51 of each groove 5 is exposed in the gap 111, thereby preventing the elastic elements of the electrical connector from scraping sidewalls of the tongue plate 11. Of course, in other embodiments, the two upper ground terminals 21 are formed by bending and extending upward from external edges of the lower ground terminals 31 of the corresponding columns, and this type of the upper and lower ground terminals 21, 31 also have grooves 5.

Specifically, as described above, the upper row of conductive terminals 2 includes a plurality of pairs of the upper differential signal terminals 23, concretely, includes three pairs in the present embodiment, wherein two pairs of the upper differential signal terminals are respectively adjacent to and configured at the inner sides of the two upper ground terminals, two upper power terminals 22 are respectively configured at the inner sides of the two pairs of the upper differential signal terminals 23, and another pair of the upper differential signal terminals 23 is configured between the two upper power terminals 22. Likewise, the lower row of conductive terminals 3 includes three pairs of the lower differential signal terminals 33, which are arranged corresponding to the upper differential signal terminals 23.

More specifically, the upper row of conductive terminals 2 further includes an upper detecting terminal 24 and an upper reservation terminal 25, which are respectively located at left and right sides of the middle pair of the upper differential signal terminals 23; correspondingly, the lower row of conductive terminals 3 also includes a lower detecting terminal 34 and a lower reservation terminal 35, which are respectively located at right and left sides of the middle pair of the lower differential signal terminals 33.

Figure 2:
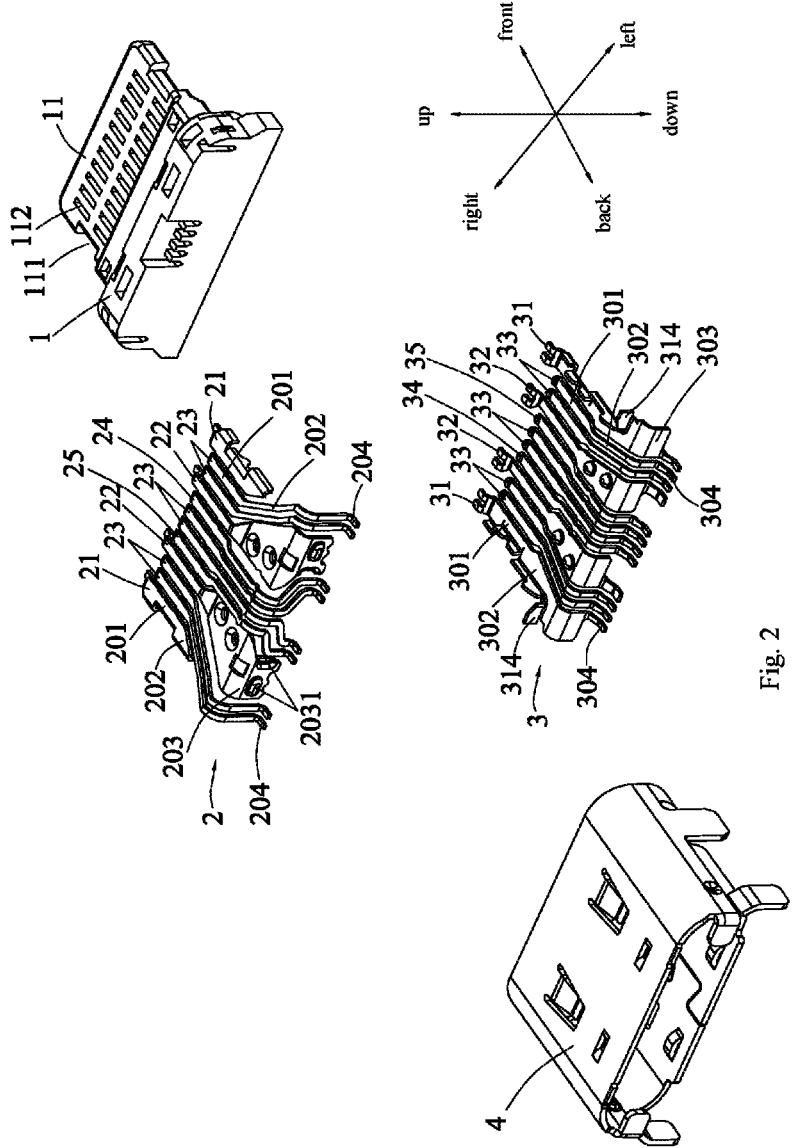
FIG. 2 is another exploded view of FIG. 1.

In particular, the order for arranging the upper soldering portion 204 and the lower soldering portion 304 is not limited, in this embodiment, as shown in FIG. 2, seen from left to right, the soldering portions sandwiched between the two lower power terminals under 32 are, in order, the soldering portions of the upper reservation terminal 25, the upper differential signal terminal 23, the lower detecting terminal 34, a pair of the lower differential signal terminals 33, the lower reservation terminal 35, the upper differential signal terminal 23 and the upper detecting terminal 24.

Figure 5:
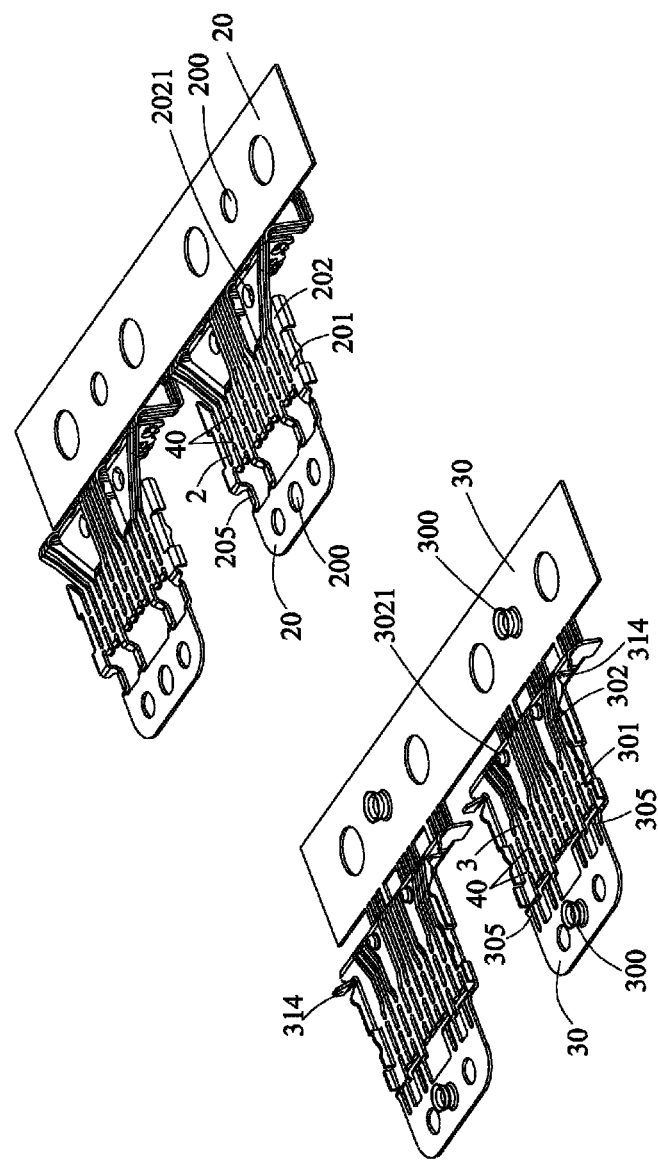
FIG. 5 is a schematic view showing the manufacturing structure of the upper and lower conductive terminals of the electrical connector according to the first embodiment of the present invention.
Figure 6:
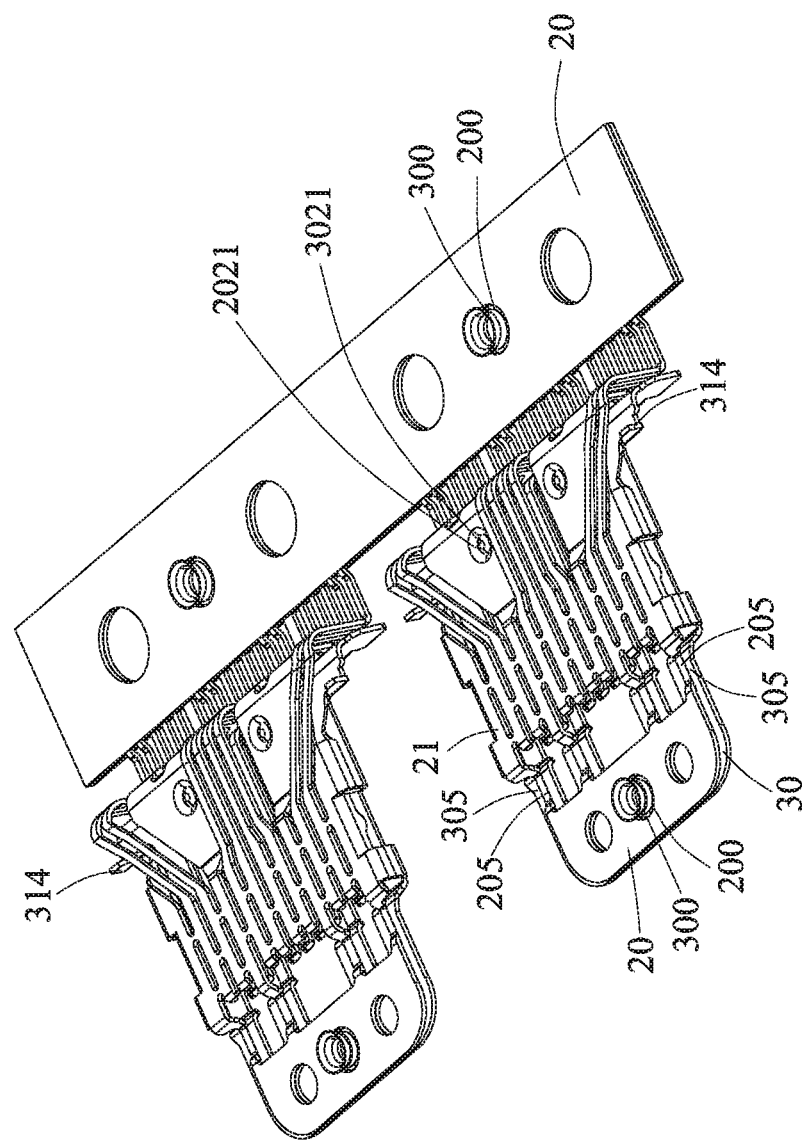
FIG. 6 is a schematic view positioning the upper conductive terminals above the lower conductive terminals of FIG. 5.
Figure 7:
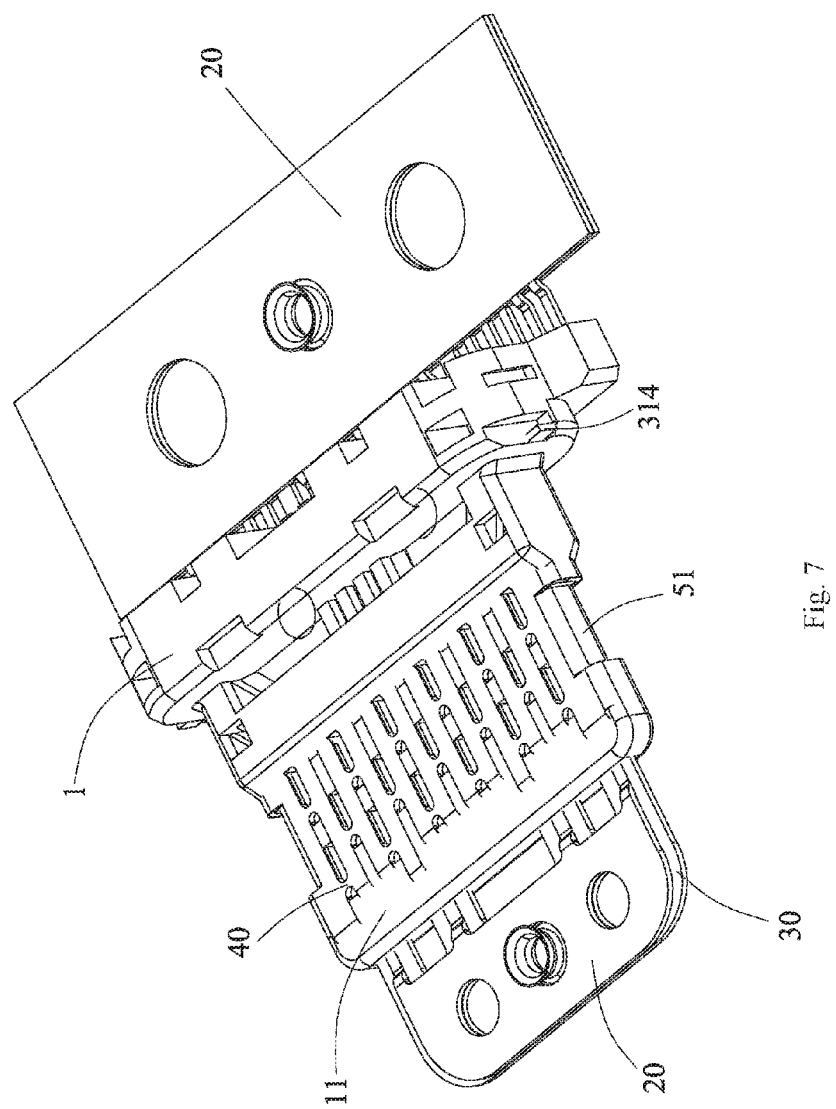
FIG. 7 is a schematic view molding the upper and lower conductive terminals of FIG. 6 in the insulating body.

Referring to FIGS. 5 to 7, the electrical connector of the present invention is made by the following steps:

Step one: providing an upper row of conductive terminals 2 and a lower row of conductive terminals 3, the upper row of conductive terminals 2 includes a plurality of upper conductive terminals, each of the upper conductive terminals has an upper contact portion 201, the lower row of conductive terminals 3 includes a plurality of lower conductive terminals, each of the lower conductive terminals having a lower contact portion 301. In particular, providing a metal sheet, forming the upper row of conductive terminals 2 and the lower row of conductive terminals 3 by stamping and cutting the metal sheet, and the upper row of conductive terminals 2 and the lower row of conductive terminals 3 are respectively connected with an upper feeding strip 20 and a lower feeding strip 30, each upper conductive terminal has an upper contact portion 201 and an upper fixing portion 202, the upper row of conductive terminals 2 includes the upper ground terminals 21, the upper power terminals 22, and the upper differential signal terminals 23, each lower conductive terminal has a lower contact portion 301 and a lower fixing portion 302, and the lower row of conductive terminals 3 includes the lower ground terminals 31, the lower power terminals 32, and the lower differential signal terminals 33. Every two adjacent upper contact portions 201 and every two adjacent lower contact portions 301 are connected with a feeding bridge 40 therebetween, the feeding bridges 40 of the two adjacent upper contact portions 201 and the two adjacent lower contact portions 301 of the corresponding columns are misaligned in a direction of front and back, and such arrangement of the feeding bridges 40 is easy to be cut off.

Step two: the upper conductive terminals vertically correspond to the lower conductive terminals one by one so as to form a plurality of corresponding columns. Concretely, positioning the upper row of conductive terminals 2 above the lower row of conductive terminals 3, and the upper contact portions 201 and the lower contact portions 301 are vertically aligned one by one.

Step three: fixedly connecting the upper and lower conductive terminals of at least one corresponding columns by riveting. Concretely, fixedly connecting the upper and lower power terminals 22, 32 and the upper and lower ground terminals 21, 31 of the corresponding columns by riveting, more concretely, fixedly connecting the upper and lower feeding portions 205, 305 of the upper and lower power terminals 22, 32 and the upper and lower ground terminals 21, 31 of the corresponding columns by riveting, and at the same time fixedly connecting the upper fixing portions 202 of the upper power terminals 22 and the lower fixing portions 302 of the lower power terminals 32. Of course, in other embodiments, only the upper and lower power terminals 22, 32 or the upper and lower ground terminals 21, 31 of at least one corresponding columns can be connected by riveting, additionally, only the upper and lower fixing portions 202, 302 or the upper and lower feeding portions 205, 305 can be connected by riveting. The method further includes a step of fixing the upper feeding strip 20 and the lower feeding strip 30 by riveting, the upper feeding strip 20 is provided with a convex column extending downward or a perforation 200, the lower feeding strip 30 is provided with the perforation 200 or the convex column 300 extending upward, and the convex column is riveted in the perforation 200.

Step four: molding an insulating body 1 having a tongue plate 11 on the upper row of conductive terminals 2 and the lower row of conductive terminals 3, and the upper contact portions 201 and the lower contact portions 301 are respectively exposed on an upper surface and a lower surface of the tongue plate 11. Specifically, the manufacturing method further includes a step of removing the upper feeding strip 20 at the front of the upper contact portion 201 and the lower feeding strip 30 at the front of the lower contact portion 301, and the removing step can be processed before or after the step four, preferably, after the step four, so that the upper and lower feeding portions 205, 305 would not be exposed at the front end of the tongue plate 11, thereby providing a good appearance. More specifically, the insulating body 1 is formed on the upper row of conductive terminals 2 and the lower row of conductive terminals 3 by injection molding way.

Figure 4:
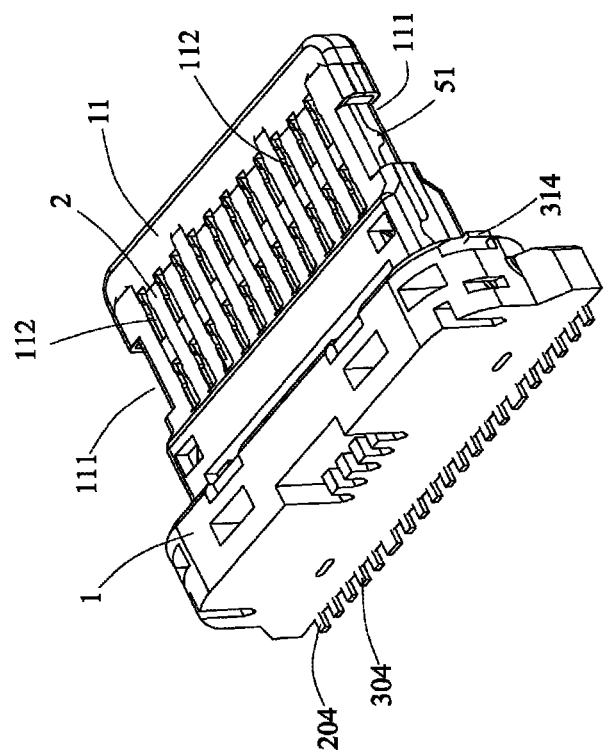
FIG. 4 is a perspective view of the electrical connector when upper and lower conductive terminals has been buried and molded in an insulating body according to the first embodiment of the present invention.

Preferably, The manufacturing method further includes a step of removing the upper feeding strip 20, the lower feeding strip 30, and the feeding bridges 40 by cutting equipment after the step four, after removing the feeding bridges 40, through slots 112 that extend vertically through the tongue plate 11 are formed at the position of the feeding bridges 40, as shown in FIG. 4.

Figure 3:
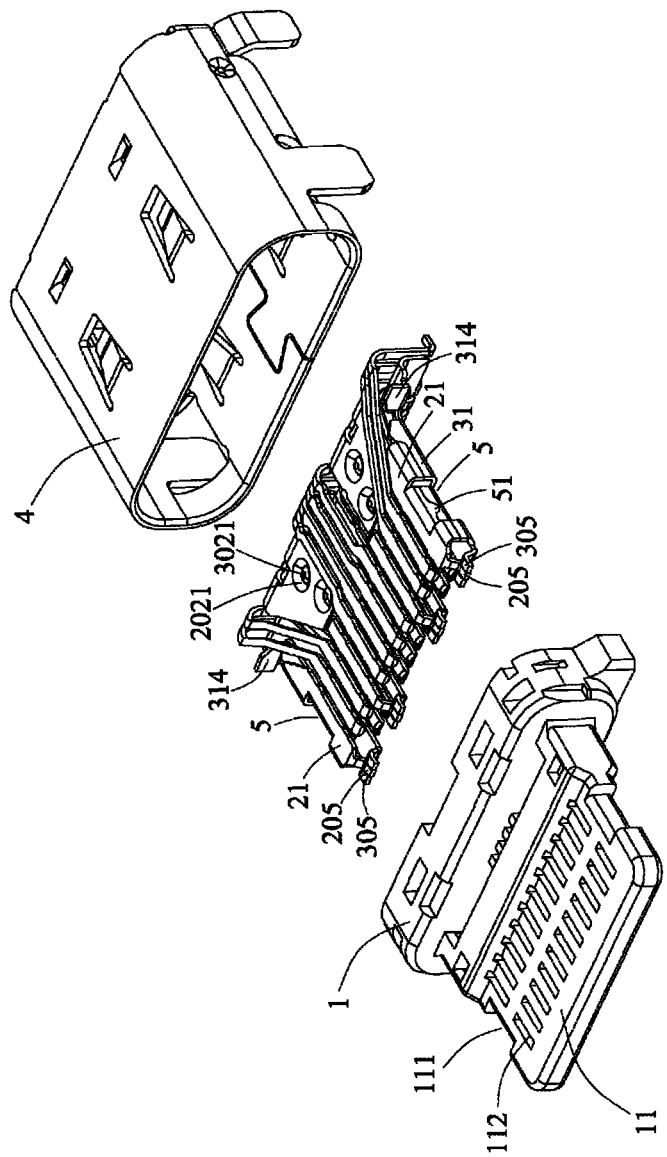
FIG. 3 is another exploded view of the electrical connector according to the first embodiment of the present invention.

Finally, providing and assembling a metal housing 4, as shown in FIGS. 1-3.

It should be noted that, in other embodiments, the shape of the upper and lower fixing portion 202, 302 of the upper and lower ground terminals 21, 31 can be shaped as the upper and lower fixing portions 202, 302 of the upper and lower power terminals 22, 32, then the upper and lower fixing portion 202, 302 of the upper and lower ground terminals 21, 31 of the corresponding column are connected by the above riveting method of the upper and lower fixing portions 202, 302 of the upper and lower power terminals 22, 32, and the shape of the upper and lower fixing portions 202, 302 of the upper and lower power terminals 22, 32 is changed to be smaller to arrange other upper or lower conductive terminals. The upper row of conductive terminals 2 may only have the upper power terminals 22 and the upper ground terminals 21, and the lower row of conductive terminals 3 may only have the lower power terminals 32 and the lower ground terminals 31, in this way, the electrical connector of the present invention just can be used for power transmission.

Embodiment 2

Differences between embodiment 1 and embodiment 2 have: (1) the connecting method of the upper fixing portions 202 of the upper power terminals 22 and the lower fixing portions 302 of the lower power terminals 32; (2) the connecting method of the upper feeding strip 20 and the lower feeding strip 30 in the step three.

Figure 8:
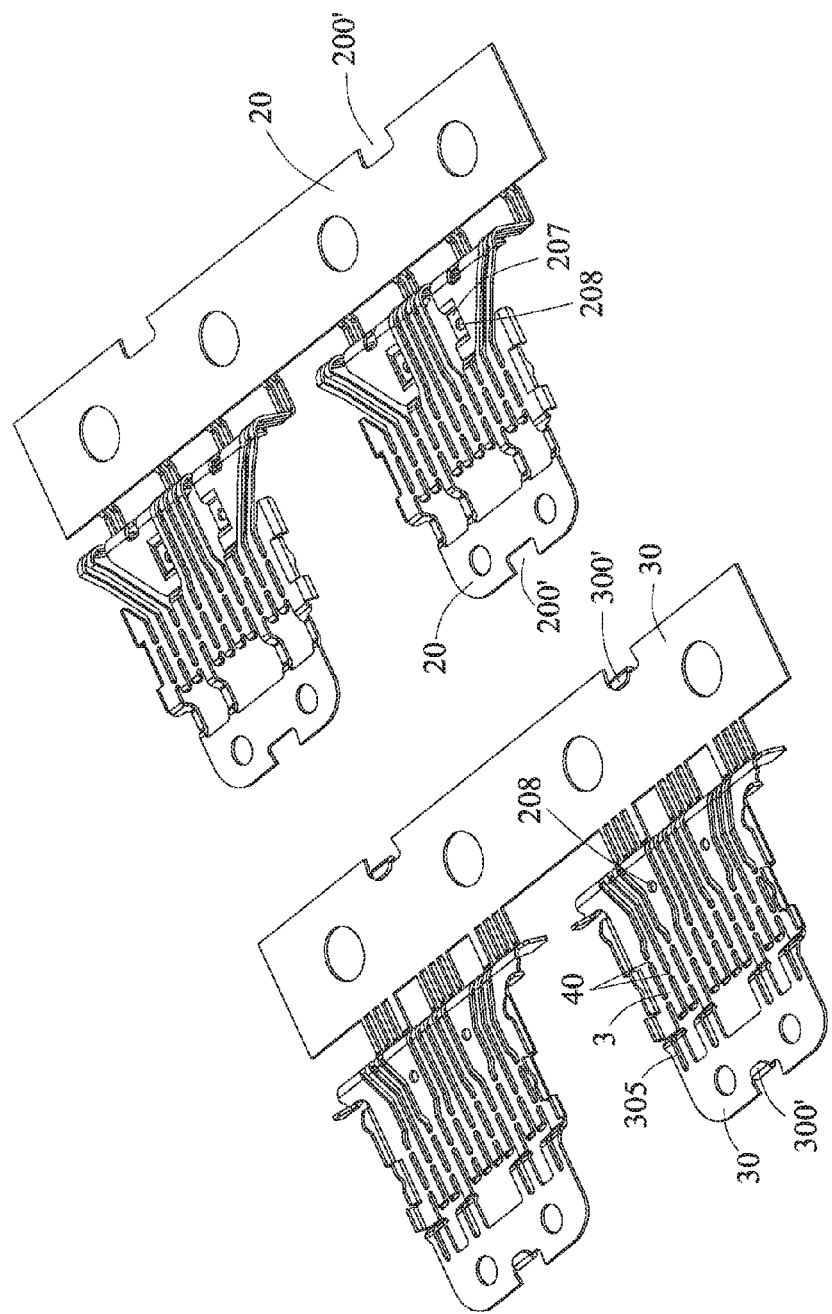
FIG. 8 is a schematic view showing the manufacturing structure of the upper and lower conductive terminals of the electrical connector according to the second embodiment of the present invention.
Figure 9:
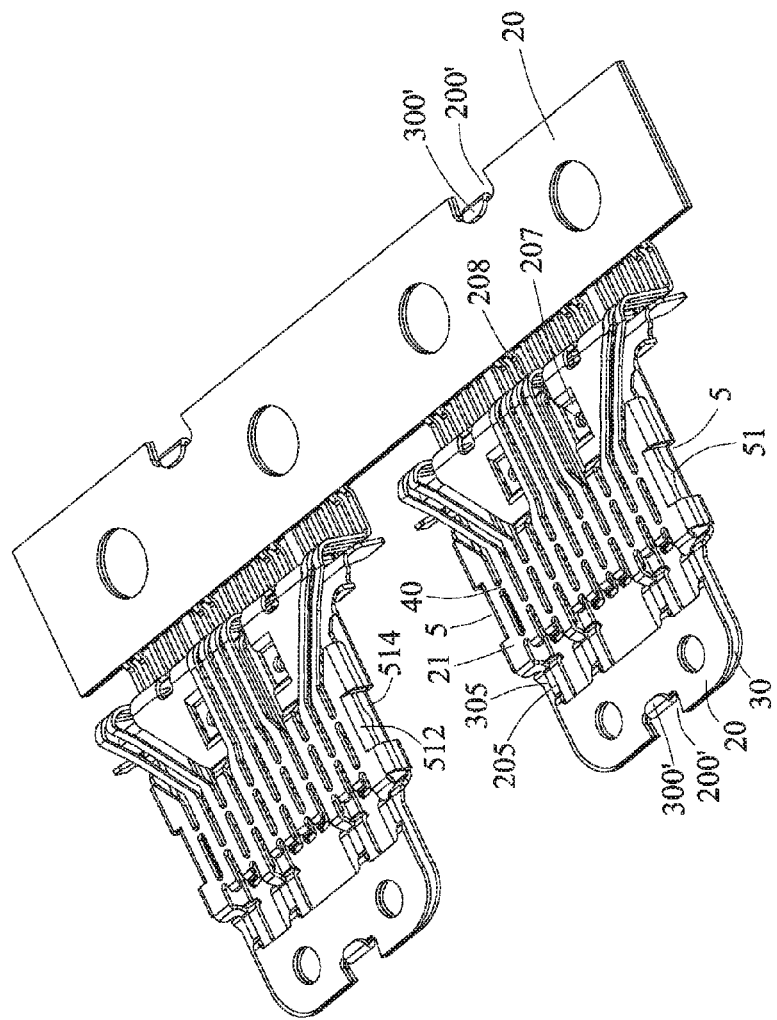
FIG. 9 is a schematic view positioning the upper conductive terminals above the lower conductive terminals of FIG. 8.

Referring to FIGS. 8 and 9, a recessed portion 207 is formed by recessing the upper fixing portion 202 of each upper power terminal downward, a bottom surface of the recessed portion 207 is contacted with a top surface of the lower fixing portion 302 of the lower power terminal 32, and a riveting hole 208 passing through the recessed portion 207 and the lower fixing portion 302 of the lower power terminal 32 is formed by riveting pressing. The upper fixing portion 202 of the upper power terminal 22 and the lower fixing portion 302 of the lower power terminal 32 can be fixedly connected by this riveting method, but the present invention is not so limited.

Specifically, the upper feeding strip 20 has a clasp piece 300' or a notch 200', the lower feeding strip 30 has a notch 200' or a clasp piece 300', and the clasp piece 300' clasps the notch 200' so as to fixedly connect the upper feeding strip 20 with the lower feeding strip 30.

Embodiment 3

As shown in FIGS. 10 to 13, an isolating piece 312, a side shield 316, and a back shield 42 are provided in the present embodiment to further improve the performance of the electrical connector.

Figure 10:
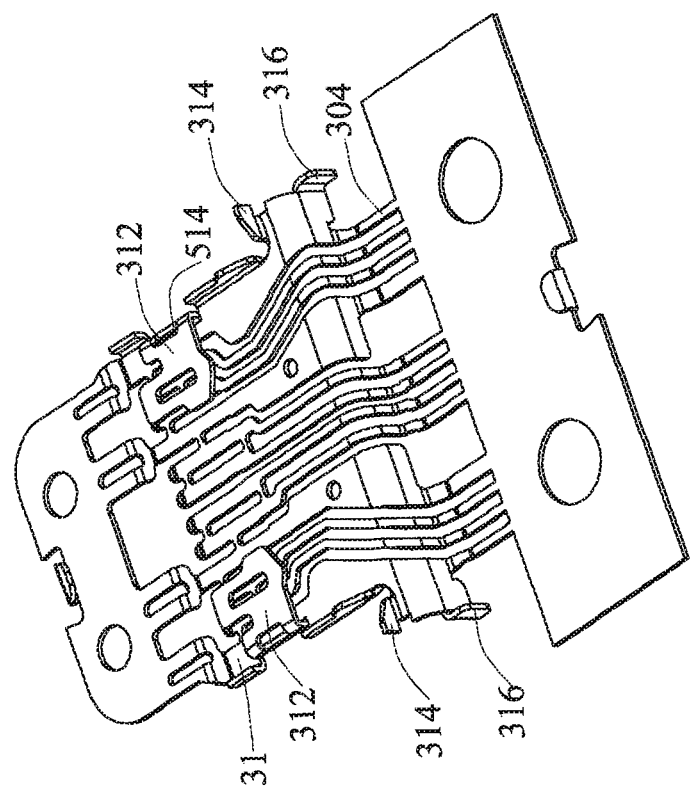
FIG. 10 is a schematic view of the lower conductive terminals of the electrical connector according to the third embodiment of the present invention.
Figure 11:
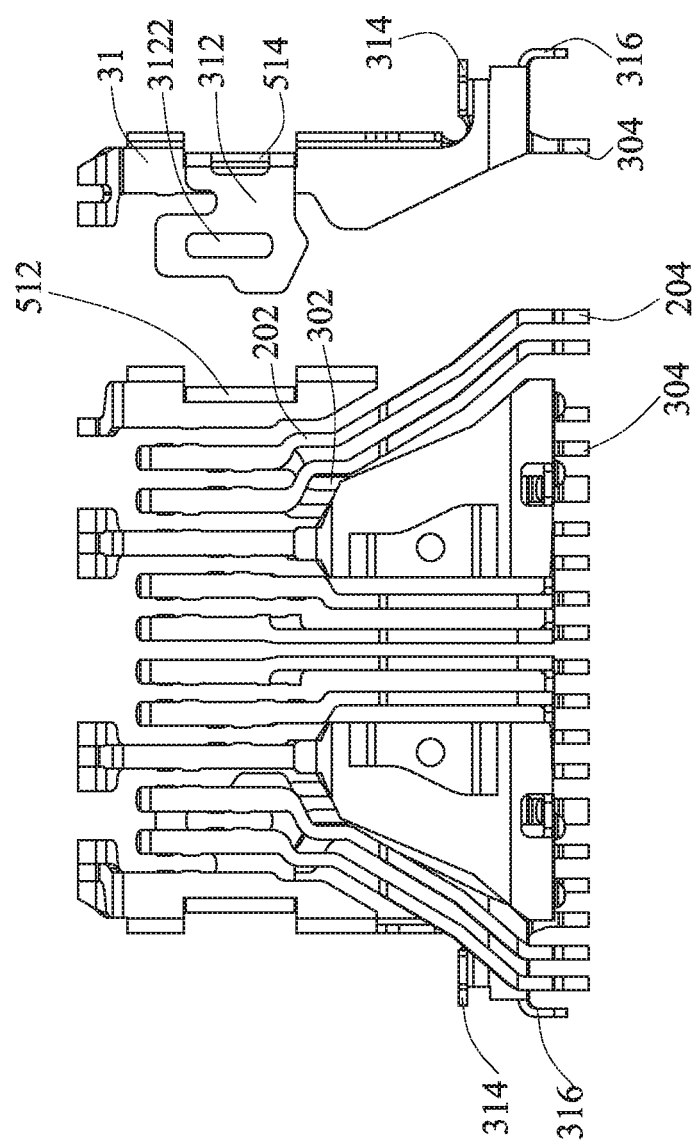
FIG. 11 is a top view of the upper and lower conductive terminals of the electrical connector according to the third embodiment of the present invention.
Figure 12:
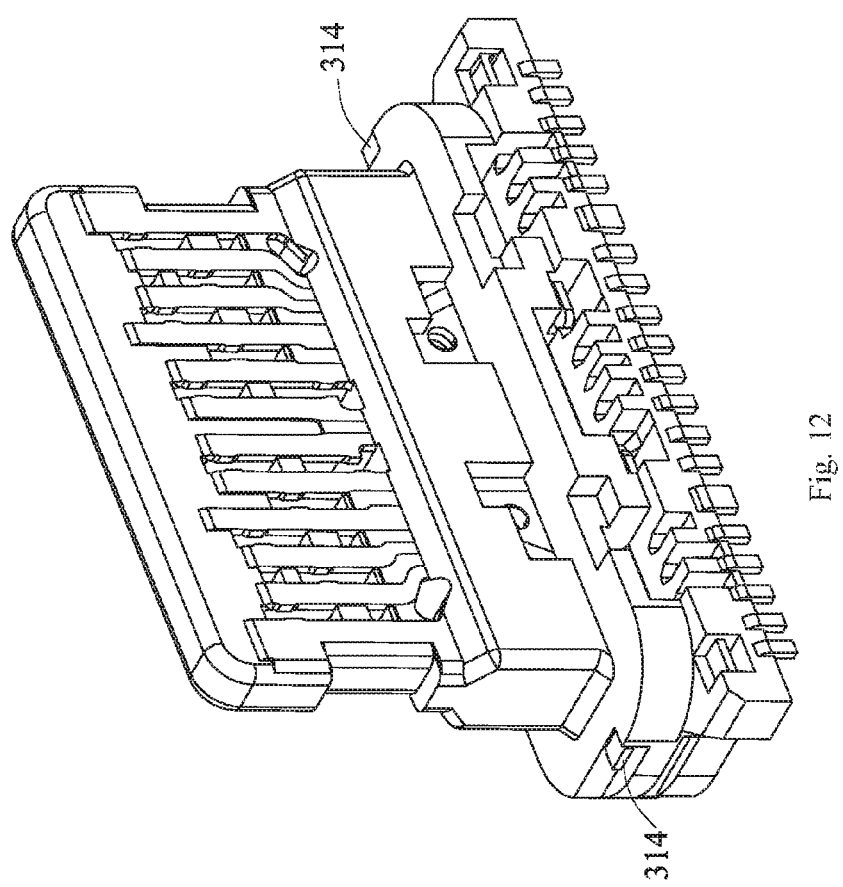
FIG. 12 is a perspective view of the electrical connector without metal housing according to the third embodiment of the present invention.

Specifically, as shown in FIGS. 10 and 11, two isolating pieces 312 are formed by respectively extending inward from the two external edges of the upper row of conductive terminals 2 or the lower row of conductive terminals 3 to the middle of the upper row of conductive terminals 2 and the lower row of conductive terminals 3, that is, the two isolating pieces 312 are formed by extending inward from the two external edges of the upper ground terminals 21 or the lower ground terminals 31, in the present embodiment, the two isolating pieces 312 are formed by respectively extending inward from the two external edges of the lower ground terminals 31 to the above of the adjacent pair of the lower differential signal terminals 33 so as to isolate the upper and lower differential signal terminals 23, 33 of the corresponding columns, thereby effectively avoiding signal crosstalk, and improving the transmission speed of the electrical connector. More particularly, the sidewall 51 of the grooves 5 is formed by an upper sidewall 512 formed by bending and extending downward from the upper ground terminal 21 and a lower sidewall 514 formed by bending and extending upward from the lower ground terminal 31, and the isolating piece 312 is formed by extending inward from the edge of the upper sidewall 512 or the lower sidewall 514. In the present embodiment, the isolating piece 312 is formed by extending inward from the upper edge of the lower sidewall 514. The isolating piece 312 and the lower sidewall 512 are formed integrally, thereby saving the mold, simplifying the assembly process, and reducing production costs. The groove 5 and the isolating piece 312 are configured at a position where the upper and lower contact portions 201, 301 locate, and an aperture 3122 is opened in the isolating piece 312. Specifically, a gap is formed between every two adjacent upper conductive terminals and every two adjacent lower conductive terminals, and the aperture 3122 is opened corresponding to the position of the gap. As described in embodiment 1, a feeding bridge 40 is configured between every two adjacent upper contact portion 201 and every two adjacent lower contact portion 301, and the aperture 3122 is configured for removing the feeding bridge 40.

Preferably, the upper fixing portion 202 and the lower fixing portion 302 of at least one pair of the upper and the lower differential signal terminals 23, 33 of the corresponding columns are misaligned in a direction of left and right, in the present invention, there are two pairs of the upper and the lower differential signal terminals 23, 33 of the corresponding columns that are misaligned, which are respectively adjacent to and configured at the inner side of the upper and lower ground terminals 21, 31 of the corresponding columns, and are high-speed transmission signal terminals.

Two side shields 316 are formed by extending backward from external edges of the upper extending portions 203 of the upper ground terminals 21 or the lower extending portion 303 of the lower ground terminals 31. In the present embodiment, the upper soldering portions 204 of the upper ground terminals 21 are removed because the upper ground terminal and the lower ground terminal are electrically connected, further, the upper extending portions 203 of the upper ground terminals 21 are also removed in order to reduce the size of the electrical connector, so the side shields 316 are configured at the lower extending portions 303 of the lower ground terminals 31. The side shields 316 are also arranged at two sides of the upper soldering portions 204 and the lower soldering portions 304, thereby effectively avoiding the signal crosstalk, and improving the transmission speed of the electrical connector. Further, the two side shields 316 can be extended out of the insulating body 1 so as to be contact with the metal housing 4 to be grounded, and the grounded side shields 316 further can avoid the signal crosstalk, and improve the transmission speed of the electrical connector.

Figure 13:
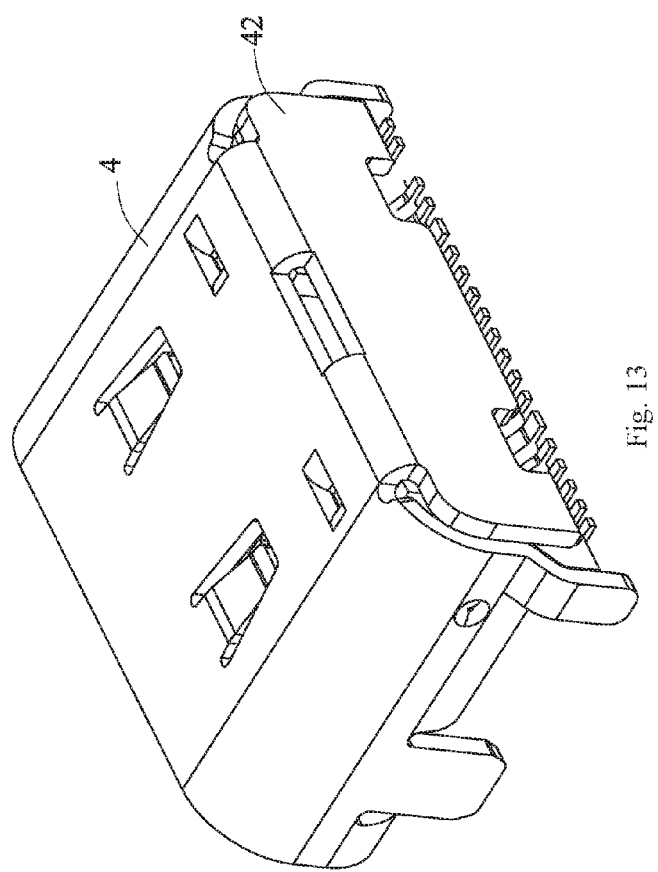
FIG. 13 is a perspective view of the electrical connector with metal housing according to the third embodiment of the present invention.

As shown in FIG. 13, preferably, a back shield 42 is formed at the back of the metal housing 4 to shield the back surface of the insulating body 1, the back shield 42 further avoids the signal crosstalk, and improves the transmission speed of the electrical connector.

Embodiment 4

Figure 14:
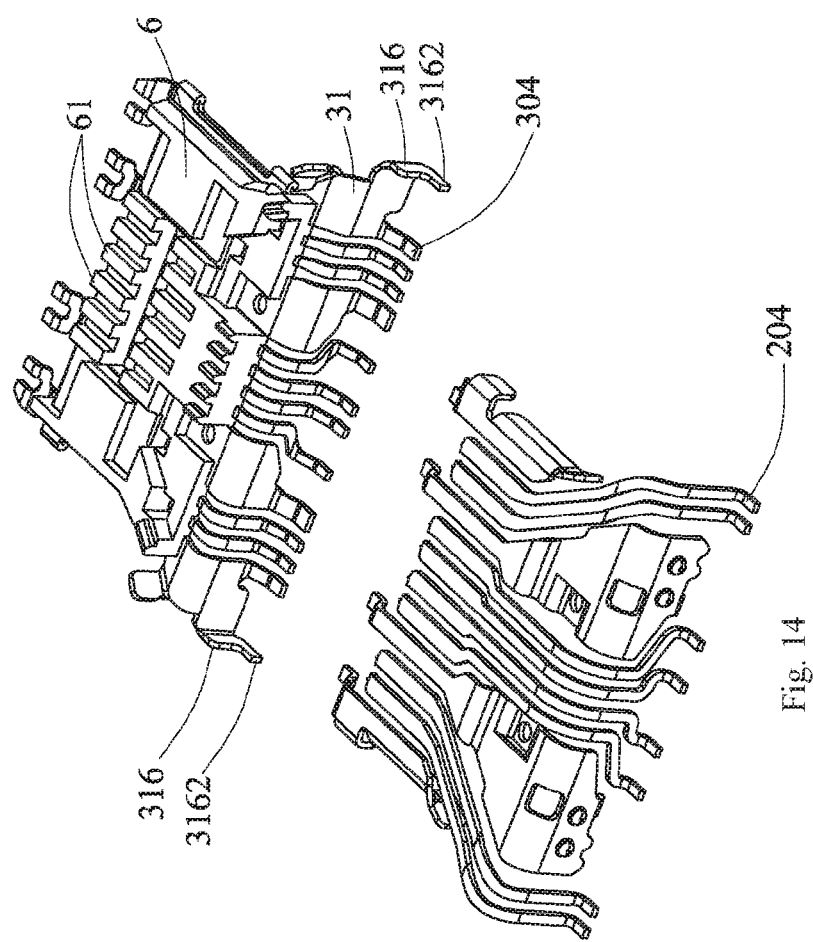
FIG. 14 is an exploded view of the upper and lower conductive terminals and the insulating body of the electrical connector according to the forth embodiment of the present invention.
Figure 15:
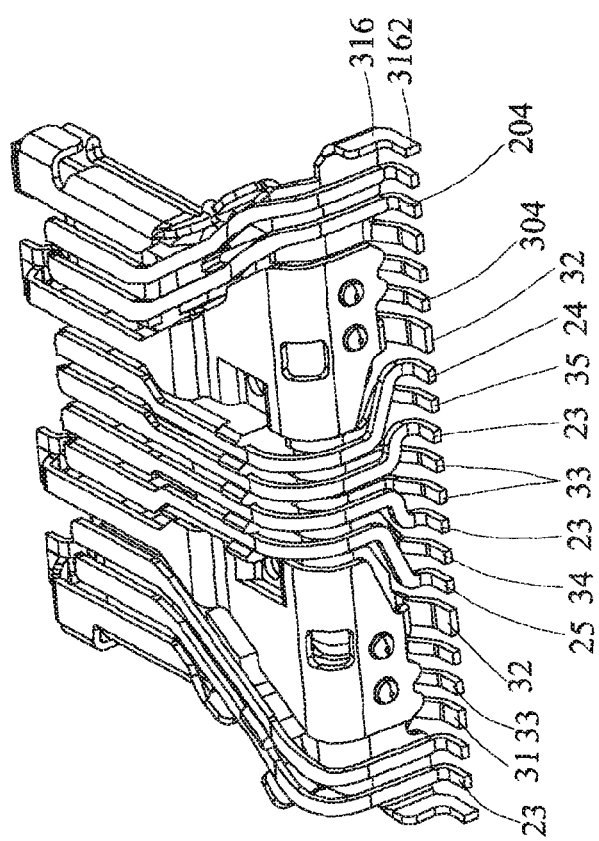
FIG. 15 is a perspective view of the upper and lower conductive terminals and the insulating body of the electrical connector according to the forth embodiment of the present invention.

During the process of manufacturing the electrical connector according to embodiments 1 to 3, the feeding bridges 40 are formed between every two adjacent upper conductive terminals and every two adjacent lower conductive terminals for preventing the two adjacent upper conductive terminals and the two adjacent lower conductive terminals from being close to each other when molding the insulating body 1 thereon. This embodiment provides another method for preventing the two adjacent upper conductive terminals and the two adjacent lower conductive terminals from being close to each other when molding the insulating body 1 thereon, in particular, as shown in FIGS. 14 to 15, there are not feeding bridges 40 between the upper conductive terminals or between the lower conductive terminals, but molding an insulating block 6 on the upper row of conductive terminals 2 or the lower row of conductive terminals 3, in the present embodiment, the insulating block 6 is molded on the lower row of conductive terminals 3, and a plurality of positioning portions 61 are configured on the insulating block 6 for positioning the upper row of conductive terminals 2. The plurality of upper conductive terminals are supported and positioned on the positioning portions 61 so as to position the upper and lower rows of conductive terminals 2, 3 and prevent the adjacent upper conductive terminals and the adjacent lower conductive terminals from being close to or contacting with each other when molding the insulating body 1.

In addition, the insulating block 6 isolates the upper row of conductive terminals 2 and lower row of conductive terminals 3 in order to reduce signal crosstalk and increase the transmission speed.

Compared with the embodiment 3, the present embodiment has different isolating pieces 312 and different side shields 316. Specifically, the upper and lower ground terminals 21, 31 of the same side together form a hollowed groove 5 that extends vertically therethrough, a sidewall 51 of the groove 5 is formed by bending and extending from one of the upper ground terminal 21 and the lower ground terminal 31, the isolating piece 312 is formed by bending and extending inward from the other one of the upper ground terminal 21 and the lower ground terminal 31. In particular, in the present embodiment, the sidewall 51 is formed by bending and extending downward from the external edge of the upper ground terminal 21 to the lower ground terminal 31, and the isolating piece 312 is formed by bending and extending inward from the external edge of the lower ground terminal 31. Each side shield 316 has a soldering pin 3162 for connecting with the circuit board, the soldering pin 3162 is formed by extending backward from the rear end of the side shield 316, and the soldering pin 3162, the upper soldering portions 204, and the lower soldering portions 304 are arranged in a row. The side shields 316 that are soldered with the circuit board can increase ground stability, provide better shielding effect of signal interference, and improve signal transmission speed.

Compared with the above-described embodiments, the order of the soldering portions of the present embodiment is different. Specifically, seen from left to right as in FIG. 2, the soldering portions sandwiched between the two lower power terminals under 32 are, in order, the soldering portions of the upper reservation terminal 25, the lower detecting terminal 34, the upper differential signal terminal 23, a pair of the lower differential signal terminals 33, the upper differential signal terminal 23, the lower reservation terminal 35, and the upper detecting terminal 24. Test results show that such arrangement of the soldering portions can effectively reduce signal crosstalk.

In comparison with the prior art, the electrical connector of the present invention has several advantages as follow:

The upper and lower conductive terminals of at least one corresponding column are fixedly connected with each other by riveting, so the upper and lower conductive terminals can be accurately and efficiently aligned when being buried and molded in the insulating body. In addition, the upper and lower conductive terminals fixedly connected with each other can be simultaneously buried and molded in the insulating body, that is, the whole manufacturing process just needs one burying and molding process, thereby simplifying manufacturing process and reducing production costs. Furthermore, the upper and lower conductive terminals fixedly connected with each other can prevent the generation of resonance and effectively prevent the signal crosstalk, so the electrical connector can provide high-speed transmission, which would need not an additional metal spacer. Moreover, the upper and lower conductive terminals fixedly connected with each other have been electrically connected, so just one of them needs a soldering portion to connect with an external circuit board, which undoubtedly reduces the size of the electrical connector due less soldering portions. Lastly, the corresponding columns are fixedly connected by riveting, and the process is simple and easy to implement. Thus, compared with the prior art, the present invention has advantages of simple structure, simple manufacturing process, small size, high-speed transmission, and reduced manufacturing costs.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An electrical connector, comprising:
an insulating body, the insulating body having a tongue plate;
a plurality of upper conductive terminals, each of the upper conductive terminals having an upper contact portion; and
a plurality of lower conductive terminals, each of the lower conductive terminals having a lower contact portion, the upper conductive terminals and the lower conductive terminals being buried and molded in the insulating body, the upper contact portions and the lower contact portions being vertically aligned one by one and respectively exposed on an upper surface and a lower surface of the tongue plate;
the upper conductive terminals vertically corresponding to the lower conductive terminals one by one so as to form a plurality of corresponding columns, and the upper and lower conductive terminals of at least one corresponding columns being fixedly connected with each other by riveting.

2. The electrical connector according to claim 1, wherein a through slot extending vertically through the tongue plate is opened between every two adjacent upper conductive terminals.

3. The electrical connector according to claim 1, wherein at least one upper conductive terminal that is fixedly connected with each other is an upper power terminal and/or an upper ground terminal, and at least one lower conductive terminal that is fixedly connected with each other is a lower power terminal and/or a lower ground terminal.

4. The electrical connector according to claim 3, wherein the upper contact portion of the upper conductive terminal that is fixedly connected with each other has an upper feeding portion at a front end thereof, the lower contact portion of the lower conductive terminal that is fixedly connected with each other has a lower feeding portion at a front end thereof, and the upper conductive terminal and the lower conductive terminal are fixedly connected with each other by the upper feeding portion and the lower feeding portion.

5. The electrical connector according to claim 4, wherein an opening is opened forward through the upper feeding portion, the lower feeding portion is riveted in the opening, or the opening is opened forward through the lower feeding portion, and the upper feeding portion is riveted in the opening.

6. The electrical connector according to claim 3, wherein a rear end of the upper contact portion of the upper conductive terminal that is fixedly connected with each other has an upper fixing portion buried in the insulating body, a rear end of the lower contact portion of the lower conductive terminal that is fixedly connected with each other has a lower fixing portion buried in the insulating body, and the upper conductive terminal and the lower conductive terminal are fixedly connected with each other by the upper fixing portion and the lower fixing portion.

7. The electrical connector according to claim 6, wherein one of the upper fixing portion and the lower fixing portion has a protrusion, the other one of the upper fixing portion and the lower fixing portion has a through hole, and the protrusion is riveted in the through hole so as to fix the upper fixing portion to the lower fixing portion.

8. The electrical connector according to claim 6, wherein a recessed portion is formed by recessing the upper fixing portion downward, a bottom surface of the recessed portion is contacted with a top surface of the lower fixing portion, and a riveting hole passing through the recessed portion and the lower fixing portion is formed by riveting pressing.

9. The electrical connector according to claim 6, wherein the upper fixing portion is formed by bending and extending firstly downward and then rearward from the rear end of the upper contact portion.

10. The electrical connector according to claim 6, wherein the width of the upper and lower fixing portions is larger than that of the corresponding upper and lower contact portions.

11. The electrical connector according to claim 6, wherein an upper extending portion is formed by bending and extending downward from a rear end of the upper fixing portion, and at least one convex is projected forward and/or backward on the upper extending portion.

12. The electrical connector according to claim 1, wherein the upper conductive terminals and the lower conductive terminals respectively have soldering portions electrically connected to a circuit board, and one of the upper conductive terminal and the lower conductive terminal that are fixedly connected with each other has one soldering portion.

13. The electrical connector according to claim 12, wherein the soldering portions of the upper conductive terminals and the lower conductive terminals are arranged in a row.

14. The electrical connector according to claim 3, wherein the upper conductive terminals comprise two upper ground terminals respectively configured at two sides thereof, and the lower conductive terminals comprise two lower ground terminals respectively configured at two sides thereof.

15. The electrical connector according to claim 14, wherein the two upper ground terminals are formed by bending and extending upward from external edges of the lower ground terminals of the corresponding columns.

16. The electrical connector according to claim 14, wherein the upper and lower ground terminals of each corresponding column together form a hollowed groove that extends vertically therethrough, each side of the tongue plate correspondingly has a hollowed gap that extends vertically therethrough, and a sidewall of each groove is exposed in the gap.

17. The electrical connector according to claim 14, wherein the upper conductive terminals comprise a plurality of pairs of upper differential signal terminals, each of which has an upper fixing portion, the lower conductive terminals comprise a plurality of pairs of lower differential signal terminals, each of which has a lower fixing portion, a pair of the upper differential signal terminals is adjacent to and configured at the inner side of each upper ground terminal, a pair of the lower differential signal terminals is adjacent to and configured at the inner side of each lower ground terminal, and the upper fixing portion and the lower fixing portion of at least one pair of the upper differential signal terminals and the lower differential signal terminals of the corresponding columns are misaligned in a direction of left and right.

18. The electrical connector according to claim 14, wherein the upper ground terminal has an upper fixing portion buried in the insulating body, the lower ground terminal has a lower fixing portion buried in the insulating body, and a contact end extends outward from the upper fixing portion of the upper ground terminal or the lower fixing portion of the lower ground terminal to the external of the insulating body to contact with a metal housing.

19. The electrical connector according to claim 1, further comprising an insulating block buried and molded on one of the upper conductive terminals and the lower conductive terminals.

20. The electrical connector according to claim 19, wherein the insulating block has a plurality of positioning portions for positioning the other one of the upper conductive terminals and the lower conductive terminals.

21. A method for manufacturing an electrical connector, comprising:
   step 1, providing a plurality of upper conductive terminals and a plurality of lower conductive terminals, each of the upper conductive terminals having an upper contact portion, each of the lower conductive terminals having a lower contact portion;
   step 2, the upper conductive terminals vertically corresponding to the lower conductive terminals one by one so as to form a plurality of corresponding columns, the upper contact portions and the lower contact portions being vertically aligned one by one;
   step 3, fixedly connecting the upper and lower conductive terminals of at least one corresponding columns by riveting; and
   step 4, molding an insulating body having a tongue plate on the upper conductive terminals and the lower conductive terminals, the upper contact portions and the lower contact portions being respectively exposed on an upper surface and a lower surface of the tongue plate.

22. The method for manufacturing an electrical connector according to claim 21, wherein every two adjacent upper contact portions and every two adjacent lower contact portions are connected with a feeding bridge therebetween, the feeding bridges of the two adjacent upper contact portions and the two adjacent lower contact portions of the corresponding columns are misaligned in a direction of front and back, and the method further comprises a step of removing the feeding bridges to form through slots that extend vertically through the tongue plate corresponding to the position of the feeding bridges after step 4.

23. The method for manufacturing an electrical connector according to claim 21, further comprising a step of molding an insulating block on one of the upper conductive terminals and the lower conductive terminals before step 2.

24. The method for manufacturing an electrical connector according to claim 21, wherein at least one upper conductive terminal that is fixedly connected is an upper power terminal and/or an upper ground terminal, and at least one lower conductive terminal that is fixedly connected is a lower power terminals and/or a lower ground terminal.

25. The method for manufacturing an electrical connector according to claim 24, wherein a rear end of the upper contact portion of the upper conductive terminal that is fixedly connected with each other has an upper fixing portion buried in the insulating body, a rear end of the lower contact portion of the lower conductive terminal that is fixedly connected with each other has a lower fixing portion buried in the insulating body, and the step 3 comprises fixedly connecting the upper fixing portion and the lower fixing portion.

26. The method for manufacturing an electrical connector according to claim 24, wherein the upper contact portion of the upper conductive terminal that is fixedly connected has an upper feeding portion at the front end thereof, the lower contact portion of the lower conductive terminal that is fixedly connected has a lower feeding portion at the front end thereof, and the step 3 is fixedly connecting the upper feeding portion and the lower feeding portion.

27. The method for manufacturing an electrical connector according to claim 26, wherein the upper feeding portions are connected with an upper feeding strip at front ends thereof, the lower feeding portions are connected with a lower feeding strip at front ends thereof, and the step 3 further comprises a step of removing the upper feeding strip and the lower feeding strip.

* * * * *